United States Patent [19]

Nilssen

[11] Patent Number: 5,239,233

[45] Date of Patent: Aug. 24, 1993

[54] HIGH EFFICACY INCANDESCENT LIGHTING PRODUCT

[76] Inventor: Ole K. Nilssen, Caesar Dr., Barrington, Ill. 60010

[21] Appl. No.: 463,777

[22] Filed: Jan. 8, 1990

Related U.S. Application Data

[63] Continuation of Ser. No. 828,455, Feb. 12, 1986, abandoned.

[51] Int. Cl.$^5$ .................................. H05B 37/00
[52] U.S. Cl. .................................. 315/57; 315/70; 315/209 T; 315/276
[58] Field of Search .......... 313/25, 579, 110, 315-318, 313/323, 341; 315/57, 64, 70, 74, 209 R, 209 T, 212-217, 223, 227 R, 276; 220/2.1 R; 333/177; 331/108 A, 114, 117, 148

[56] References Cited

U.S. PATENT DOCUMENTS

| | | |
|---|---|---|
| 2,587,169 | 2/1956 | Kivari .................................. 315/70 |
| 3,525,012 | 8/1970 | Dimitracopoulos et al. |
| 4,207,498 | 6/1980 | Spira et al. |
| 4,398,126 | 8/1983 | Zuchtriegel ............................ 315/127 |
| 4,443,778 | 4/1984 | Mewissen .............................. 315/57 |
| 4,524,302 | 6/1985 | Berlec .................................. 313/579 |
| 4,556,822 | 12/1985 | Lohrey et al. ........................ 315/64 |
| 4,591,764 | 5/1986 | Nilssen ................................ 315/172 |

FOREIGN PATENT DOCUMENTS

2415087 10/1975 Fed. Rep. of Germany ...... 315/276
2052896 1/1981 United Kingdom ................ 315/57

Primary Examiner—Robert J. Pascal

[57] ABSTRACT

At the lumen output levels of most ordinary household incandescent lamps, incandescent filaments designed for and operated at about 24 Volt RMS provide substantially higher luminous efficacy than filaments designed for and operated at 120 Volt RMS. A table lamp comprises means for converting 120 Volt/60 Hz to 120 Volt/30 kHz. The 120 Volt/60 Hz is obtained from an ordinary electrical receptacle; the 120 Volt/30 kHz is provided to the lamp socket. With 120 Volt/30 kHz on the lamp socket, any ordinary 120 Volt incandescent lamp can be used therein; as can also any special incandescent lamp having a 24 Volt filament in combination with a built-in 30 kHz voltage transformer operative to convert the 120 Volt/30 kHz socket voltage into 24 Volt/30 kHz voltage for the filament. While the size of a 60 Hz transformer capable of efficiently transforming the amount of power required by the 24 Volt filament would be far too large to be contained within a light bulb of ordinary dimensions; the size of a corresponding 30 kHz transformer is small enough to fit comfortably within the dimensions of an ordinary light bulb.

15 Claims, 2 Drawing Sheets

HIGH EFFICACY INCANDESCENT LIGHTING PRODUCT

This is a continuation of application Ser. No. 828,455, filed Feb. 12, 1986, now abandoned.

BACKGROUND OF THE INVENTION

1. Field of Invention

The present invention relates to incandescent lighting products operable to provide light at a particularly high degree of luminous efficacy.

2. Prior Art

Previous efforts at achieving significantly improved luminous efficacy in incandescent light bulbs—i.e., light bulbs adapted to screw into ordinary lamp sockets and to operate on 120 Volt RMS—have been directed toward the use of means operative to reflect infrared radiation back onto the incandescent filament while letting visible light pass through.

Examples of Approaches of this nature are provided by numerous prior art references, such as the following U.S. Pat. Nos. 1,342,894 to Bugbee; 1,425,967 to Hoffman; 2,859,369 to Williams et al.; 4,039,878 to Eijkelenboom et al.; 4,160,929 to Thorington et al.; 4,283,653 to Brett; 4,366,407 to Walsh; and 4,375,605 to Fontana et al.

However, even though the basic principle has been known for decades, and even though the potentially attainable efficacy improvement is on the order of several hundred percent, household light bulbs based on this principle of selective reflection of infrared energy is not yet available on the market. The reason for this is apparently connected with difficulties in translating the basic principle into high-volume production of corresponding cost-effective household light bulbs.

SUMMARY OF THE INVENTION

Objects of the Invention

An object of the present invention is that of providing an incandescent lighting product capable of providing light at particularly high luminous efficacy, yet without the normally concomitant decrease in life expectancy.

Another object is that of providing an incandescent lighting product that has exceptionally long life expectancy, yet without the normally concomitant descrease in luminous efficacy.

A third object is that of providing a light bulb having increased luminous efficacy and/or life expectancy.

These as well as several other important objects and advantages of the present invention will become apparent from the following description.

Brief Description

A table lamp comprises frequency conversion means and is operative to be powered with 120 Volt/60 Hz from an ordinary household electrical receptacle and to provide 120 Volt/30 kHz at its lamp socket.

A special incandescent light bulb has a 24 Volt filament and is operative to be properly powered by a 120 Volt/30 kHz voltage applied to the base electrodes of its ordinary Edison-type screw base. This special light bulb comprises transformer means connected in circuit between its base electrodes and the filament; and this transformer means is operative to transform 120 Volt/30 kHz applied at the base electrodes to 24 Volt/30 kHz applied to the filament.

The transformer means has built-in high-pass filter means operative to prevent damage in case the special light bulb were to be inserted into a lamp socket having ordinary power line voltage applied thereto.

Thus, the special light bulb may be used in and properly powered from the lamp socket of the table lamp, as can any ordinary 120 Volt light bulb as well.

PROBLEM SITUATION UNDERLYING THE INVENTION

Figure 1:
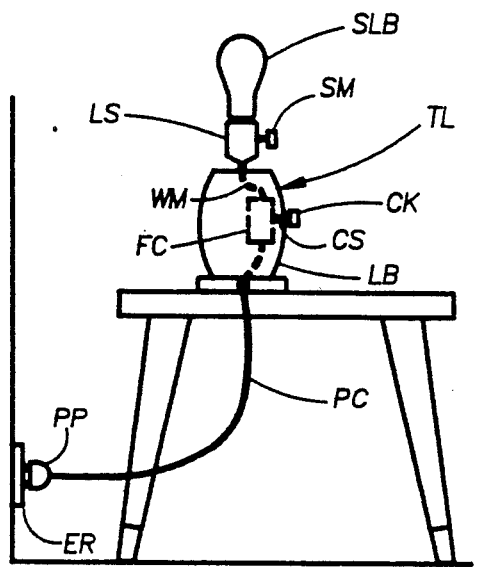
FIG. 1 illustrates the preferred embodiment of the invention and shows a table lamp having built-in frequency conversion means and a special light bulb in its socket.

The present invention is based on the recognition that significant improvements in the luminous efficacies of incandescent light bulbs can be attained by making their filaments substantially heavier than the filaments presently used in ordinary 120 Volt household light bulbs.

However, a heavier filament would require an operating current of higher magnitude, and would therefore cause more power to be drawn by the filament—as long as the magnitude of the voltage applied to the filament were to remain 120 Volt.

Of course, if it had been possible to incorporate a voltage transformer within the light bulb, a lower-voltage filament could be used, thereby attaining the desired efficacy improvement without concomitantly increasing total filament power. However, at the power levels (25 to 100 Watt) required by most ordinary incandescent light bulbs, the size and weight of such a transformer—that is, a transformer capable of converting the 120 Volt/60 Hz power line voltage to a substantially lower-magnitude voltage for application to the filament—would be so large as to prevent it from being incorporated into a light bulb of anywhere near ordinary dimensions. That is, at a frequency of 60 Hz, it must be considered totally non-feasible to provide for a voltage transformer as a built-in part of an otherwise ordinary light-bulb.

Absent other considerations, since the size and weight of a transformer is more-or-less inversely proportional to the frequency of the voltage being transformed, and if power to the light bulb could be provided at a frequency substantially higher than 60 Hz, a point would be reached where the size and weight of the requisite transformer would become small enough to fit within the confines of a light bulb of ordinary dimensions.

For instance, if the frequency of the voltage provided to power the light bulb were to be 30 kHz or so, the requisite built-in transformer would be smaller and lighter by a factor of more than 50—even after taking into account the particular characteristics of the magnetic materials required for such a high frequency.

Indeed, well within the physical dimensions of an ordinary light bulb, it is then possible to provide a special light bulb having built-in transformer means operable to convert a relatively high-magnitude 30 kHz voltage into a relatively low-magnitude 30 kHz voltage. Specifically and by way of example, it is indeed feasible to provide a built-in transformer operable to convert 120 Volt/30 kHz to 24 Volt/30 kHz, thereby providing for a light bulb operative to be powered from a source of 120 Volt RMS yet having a filament designed for operation on 24 Volt.

However, since there exist no lamp sockets providing 120 Volt/30 kHz voltage, a light bulb designed for operation on such 120 Volt/30 kHz voltage would have no utility.

So, as the next link in the problem situation underlying the invention, it is necessary to create a situation in which such a special light bulb would indeed have utility; and this next link involves the creation of lighting system or a lighting product, such as a table lamp, wherein the socket voltage is 120 Volt/30 kHz.

On the other hand, in a special table lamp, it would be relatively easy to provide 24 Volt to the socket, thereby obviating the need for having a transformer built into the light bulb. Doing so, however, would prevent ordinary light bulbs from being used in that table lamp; which might make things very inconvenient for the user of that table lamp, and would probably not constitute a commercially acceptable solution.

The solution provided by instant invention recognizes these various issues and provides for a situation where the lamp socket is fully operable to power a special light bulb requiring 120 Volt/30 kHz for its proper operation as well as any ordinary 120 Volt light bulb, thereby obviating the above compatibility concerns.

In other words, the special light bulb herein described does not represent a solution to any presently known problem—if for no other reason that it would have no known utility at the present time. Likewise, the special table lamp herein described does not represent a solution to any presently known problems—if for no other reasons that the provision of 120 Volt/30 kHz lamp socket voltage would have no known utility at the present time.

In combination, however, the resulting lighting product represents a specific solution to the general problem of providing incandescent lighting having improved luminous efficacy.

DESCRIPTION OF THE PREFERRED EMBODIMENT

Details of Construction

FIG. 1 illustrates the preferred embodiment of the invention.

In FIG. 1, a table lamp TL has a lamp base LB and a lamp socket LS with a switch means SM. Mounted inside the lamp base and shown in phantom is a frequency converter FC with a control shaft CS protruding through to the wall of the lamp base. A control knob CK is mounted on this control shaft.

Connected with frequency converter FC is a power cord PC with a power plug PP plugged into an ordinary household electrical receptacle ER. The lamp socket is connected with frequency converter FC by way of wire means WM.

A special light bulb SLB is screwed into lamp socket LC; which lamp socket is of a type adapted to receive an ordinary Edison-type light bulb.

Figure 2:
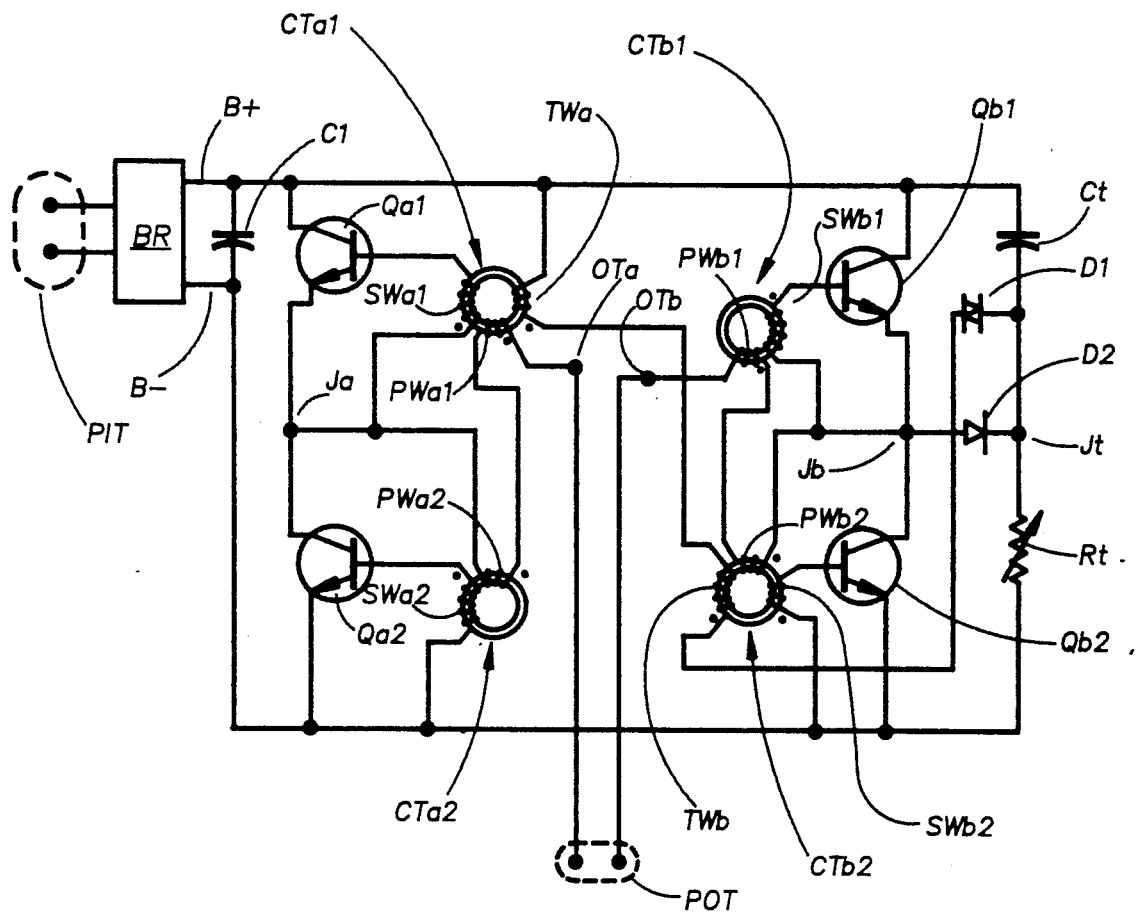
FIG. 2 is an electrical circuit diagram of the frequency converter means.

FIG. 2 is an electric circuit diagram of the frequency converter means.

In FIG. 2, a bridge rectifier BR has a pair of power input terminals PIT adapted to connect with ordinary 120 Volt/60 Hz power line voltage.

The positive voltage output from rectifier BR is connected with a B+ bus; and the negative voltage output from rectifier BR is connected with a B− bus. A capacitor C1 is connected betweeen the B+ bus and the B− bus.

A transistor Qa1 is connected with its collector to the B+ bus and with its emitter to a junction Ja. Another transistor Qa2 is connected with its collector to junction Ja and with its emitter to the B− bus.

Similarly, a transistor Qb1 is connected with its collector to the B+ bus and with its emitter to a junction Jb; while yet another transistor Qb2 is connected with its collector to junction Jb and with its emitter to the B− bus.

The base of transistor Qa1 is connected with junction Ja by way of secondary winding SWa1 on current transformer CTa1; and the base of transistor Qa2 is connected with the B− bus by way of secondary winding SWa2 of current transformer CTa2./

Similarly, the base of transistor Qb1 is connected with junction Jb by way of secondary winding SWb1 on current transformer CTb1; and the base of transistor Qb2 is connected with the B− bus by way of secondary winding SWb2 of current transformer CTb2.

An output terminal OTa is connected with junction Ja by way of series-connected primary windings PWa1 and PWa2 of current transformers CTa1 and CTa2, respectively.

Another output terminal OTb is connected with junction Jb by way of series-connected primary windings PWb1 and PWb2 of current transformers CTb1 and CTb2, respectively.

A capacitor Ct is connected between the B+ bus and a junction Jt; and an adjustable resistor Rt is connected between junction Jt and the B− bus. A Diac D1 from junction Jt to the B+ bus by way of series-connected tertiary windings TWa and TWb of current transformers CTa1 and CTb2, respectively. A diode D2 is connected with its cathode to junction Jt and with its anode to junction Jb.

Figure 3:
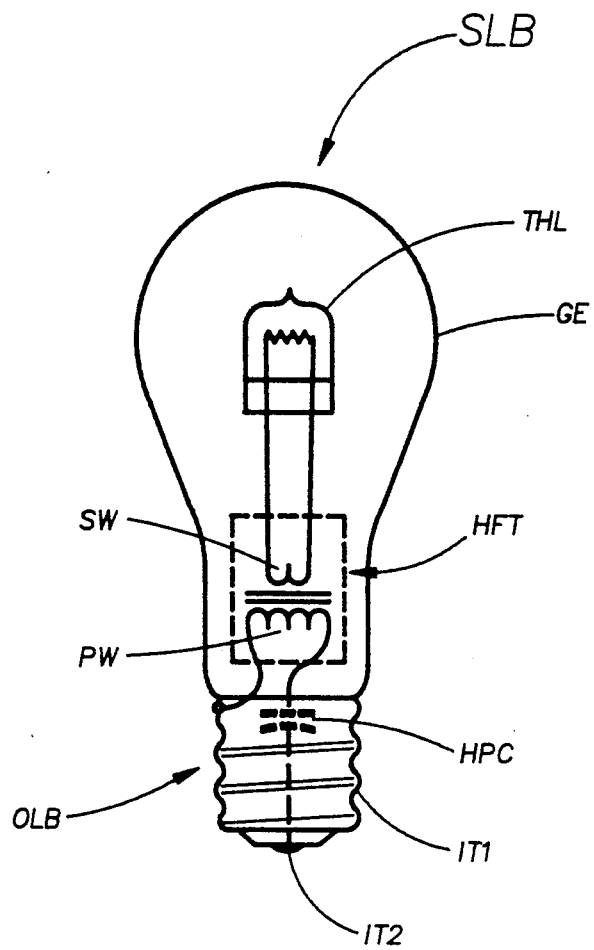
FIG. 3 shows details of the special light bulb.

FIG. 3 illustrates the special light bulb used in lamp socket LS of FIG. 1. Special light bulb SLB has the size and shape of an ordinary household incandescent light bulb, and comprises a built-in high-frequency transformer HFT and a Tungsten-Halogen lamp THL.

The transformer has a primary winding PW connected between input terminals IT1 and IT2 of screw-in "one-way" lamp base OLB by way of high-pass capacitor HPC; and it has a secondary winding SW connected directly with the terminals of Tungsten-Halogen lamp THL. Both the transformer and the Tungsten-Halogen lamp are enclosed within a glass envelope GE.

Figure 4:
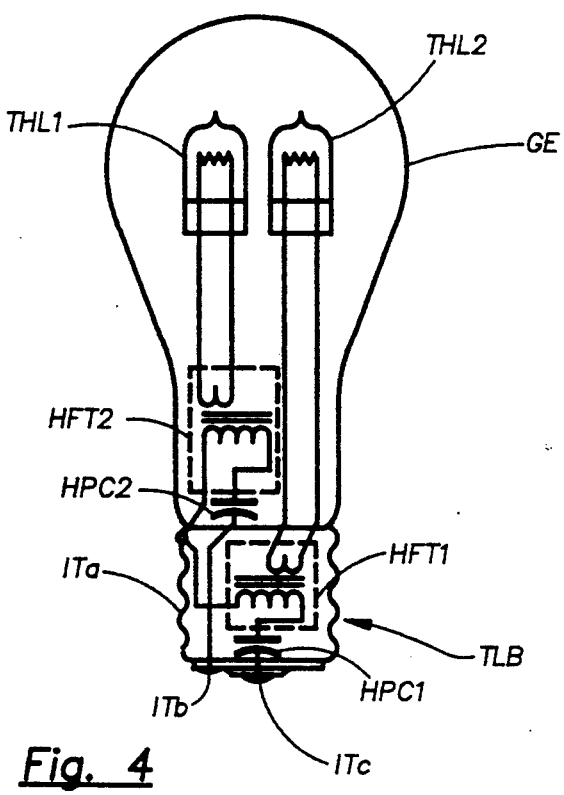
FIG. 4 shows details of a three-way version of the special light bulb.

FIG. 4 illustrates a three-way version of the special light bulb of FIG. 3.

In FIG. 4, two Tungsten-Halogen lamps THL1 and THL2 are comprised within glass envelope GE. Lamp THL1 is connected with the secondary winding of a first high-frequency transformer HFT1; and lamp THL2 is connected with the secondary winding of a second high-frequency transformer HFT2.

The primary winding of transformer HFT1 is connected between input terminals ITa and ITc of three-way lamp base TLB by way of high-pass capacitor HPC1; and the primary winding of transformer HFT2 is connected between terminals ITa and ITb of lamp base TLB by way of high-pass capacitor HPC2.

Details of Operation

Lamp base LB of FIG. 1 comprises the frequency converter of FIG. 2, which is identified as element FC. Screwed into lamp socket LS—which is an ordinary three-way lamp socket having ordinary four-position switch means SM—is the special light bulb of FIG. 3 or, alternatively, the special three-way light bulb of FIG. 4.

With power plug PP plugged into household electrical receptacle ER, ordinary 120 Volt/60 Hz power line voltage is provided to the frequency converter; and 120 Volt/30 kHz is provided from the frequency converter to the lamp socket.

Hence, lamp socket LS is provided with 120 Volt/30 Khz voltage and any ordinary one-way or three-way 120 Volt incandescent light bulb may be properly used therein.

Also, either of the special light bulbs of FIG. 3 and FIG. 4 may be properly used therein.

The frequency converter of FIG. 2 comprises a bridge rectifier (BR) operative to provide unfiltered full-wave-rectified 120 Volt/60 Hz power line voltage between the B+ bus and the B− bus.

The purpose of capacitor C1 is that of providing a low-impedance path for 30 kHz inverter currents. However, it provides substantially no filtering for the full-wave-rectified power line voltage present between the B+ bus and the B− bus.

Thus, the voltage applied to the full-bridge inverter, which consists principally of transistors Qa1, Qa2, Qb1 and Qb2, is a series of unidirectional voltage pulses provided at the rate of 120 pulses per second. The RMS magnitude of this pulsed DC voltage is 120 Volt.

In other words, the RMS magnitude of the DC voltage applied to the full-bridge inverter is 120 Volt; which—as long as the inverter oscillates—makes the RMS magnitude of the inverter output voltage also 120 Volt.

Otherwise, the operation of the full-bridge inverter of FIG. 2 is entirely analogous to that of the half-bridge inverter described in U.S. Pat. No. 4,506,318 to Nilssen, including the adjustability of the RMS magnitude of the inverter output voltage.

The RMS magnitude of the output voltage of the inverter of FIG. 4 is adjustable by way of varying the magnitude of resistor Rt: a low value for Rt provides for maximum output voltage RMS magnitude, whereas higher values of Rt provides for ever decreasing magnitude. In effect, adjusting the value of Rt in the inverter of FIG. 2 is equivalent to adjusting the value of the trigger-point-control potentiometer in an ordinary Triac light dimmer.

The inverter self-oscillates by way of current feedback provided by the four positive feedback current transformers CTa1, CTa2, CTb1 and CTb2; which means that the inverter will not oscillate without having a load connected between its power output terminals POT.

Thus, the inverter used in the frequency converter of FIG. 1 stops oscillating whenever special light bulb SLB is switched off or removed.

The special light bulb of FIG. 3 has a filament designed for operation on a voltage of 24 Volt RMS magnitude; which is the voltage magnitude at which—at the power levels normally used with household light bulbs—luminous efficacy reaches its maximally attainable level.

With 120 Volt/30 kHz applied to input terminals IT1 and IT2 of special light bulb SLB, a voltage of 24 Volt/30 kHz is provided to the filament of Tungsten-Halogen lamp THL. Transformer HFT is of construction that is entirely ordinary for frequencies on the order of 30 kHz.

Capacitor HPC is of such value as to represent substantially no impedance for currents at 30 kHz and above, yet representing a substantial impedance to currents at 60 Hz and below; which implies that light bulb SLB would not sustain damage if mistakenly screwed into a lamp socket powered with 120 Volt/60 Hz.

The operation of the special three-way light bulb of FIG. 4 is entirely analogous to that of the special one-way light bulb of FIG. 3; which implies that it will operate in a manner that is entirely analogous to that of an ordinary 120 Volt three-way light bulb.

Additional Comments a) Since the voltage provided to the lamp socket in FIG. 1 is of 120 Volt RMS magnitude, ordinary 120 Volt light bulbs may be properly used therein; which means that the utility of the table lamp would not depend on having available one of the special light bulbs. However, it is necessary that the power output capability of the frequency converter be adequate to handle the power required by the largest light bulb that might expectedly be used in the lamp socket.

b) It is anticipated that the outer glass envelope of the special light bulb (GE in FIGS. 3 and 4) be made removable, thereby to permit replacement of the Tungsten-Halogen lamps; in which case, of course, socket means would be provided for these lamps.

c) In addition to having the value of protecting the special light bulb from damage in case it were to be screwed into a lamp socket powered with 120 Volt/60 Hz, capacitor HPC constitutes a means to prevent potentially damaging magnitudes of direct current from being extracted from the frequency converter when its output is connected to a transformer primary having little or no DC impedance. Such damaging magnitudes of direct current are apt to occur as a result of only slight asymmetries in the waveform of the inverter squarewave output voltage.

However, with a resistive load—such as an ordinary 120 Volt light bulb—the magnitude of the direct current resulting from any asymmetry in the inverter waveform is not apt to constitute a problem.

d) Control knob CK of FIG. 1 is operable to adjust the magnitude of resistor Rt of FIG. 2, thereby correspondingly to cause adjustment of the RMS magnitude of the voltage provided to the lamp socket. Thus, CK is a dimming control.

d) It is believed that the present invention and its several attendant advantages and features will be understood from the preceeding description. However, without departing from the spirit of the invention, changes may be made in its form and in the construction and interrelationships of its component parts, the form herein presented merely representing the presently preferred embodiment.

I claim:

1. A lamp holder adapted: i) to connect with an ordinary electric utility power line having a power line voltage, and ii) to receive and hold an ordinary Edison-type light bulb; the lamp holder comprising:

frequency converter means having: i) connect means operative to connect with the power line voltage, and ii) output terminal means operative to provide an output voltage having magnitude about equal to that of the power line voltage but having frequency substantially higher than that of the power line voltage;

socket means connected with the output terminal means and operative to receive and hold an ordinary Edison-type light bulb; and structure means operative to hold together the frequency converter means and the socket means such as to form an integral lamp holder.

2. The lamp holder of claim 1 wherein the frequency converter is operative to provide the output voltage only as long as a load means is connected with the output terminal means.

3. A lamp holder means comprising:

frequency converter means having: i) input terminals operative to connect with an ordinary electric utility power line, and ii) output terminals operative to provide an output voltage of frequency substantially higher than that of the voltage on the power line;

lamp socket means operative to receive and hold an incandescent light bulb having screw-base operative to be screwed into and held by an ordinary Edison-type lamp socket, the lamp socket means having socket terminals connected with the output voltage; and structure means operative to mechanically hold together the frequency converter means and the lamp socket means;

thereby to form a lamp holder means operative to properly power an ordinary Edison-type incandescent light bulb as well as a special light bulb requiring for its proper operation a voltage of frequency substantially higher than that of the voltage on the power line.

4. The lamp holder of claim 3 wherein: i) the lamp socket means is a three-way lamp socket, and ii) the special light bulb is a three-way light bulb.

5. A combination comprising:

lamp means: (i) having an Edison-type screw base with a pair of power light terminals; and (ii) being adapted to operate properly only when provided at its power input terminals with an input voltage having frequency substantially higher than that of the power line voltage of an ordinary electric utility power line; and lamp holder means connected with an ordinary electric utility power line and operative: (i) to receive, to hold, and to connect with the lamp means by way of its Edison-type screw base; and (ii) thereby to provide said input voltage to its power input terminals; the lamp holder means including an electronic frequency conversion means.

6. A lamp holder adapted: (i) to connect with an ordinary electric utility power line having a power line voltage; and (ii) to receive and hold a light bulb having an ordinary Edison-type screw-base; the lamp holder comprising:

a frequency converter means having: (i) connect means operative to connect with said power line voltage, and (ii) output terminal means operative to provide an output voltage having frequency substantially higher than that of the power line voltage;

a lamp socket means connected with the output terminal means and operative to receive and hold an ordinary light bulb; and structure means operative to hold together the frequency converter and the lamp socket, thereby to make said lamp holder a mechanically integral entity.

7. A combination comprising:

frequency converter means having: (i) input terminals operative to connect with the power line voltage of an ordinary electric utility power line; and (ii) output terminals operative to provide an output voltage of frequency substantially higher than that of the power line voltage; and lamp holder means having a lamp socket adapted to receive and hold a light bulb with an ordinary Edison-type screw-base; the lamp socket having socket terminals connected with said output voltage;

thereby to provide an arrangement operative to properly power: (i) any one of various substantially ordinary Edison-type incandescent light bulbs; as well as (ii) any one of various special light bulbs having Edison-type screw-bases and requiring for their proper operation to be supplied with a voltage of frequency substantially higher than that of the power line voltage.

8. A combination comprising:

an incandescent lamp having a filament sealed within an inner envelope; the filament being connected with lamp terminals protruding through and accessible from outside of the inner envelope;

screw-base operative to be inserted into and to be held by an ordinary Edison-type lamp socket; the screw-base having base terminals;

linear electric circuit means operative to connect the filament in circuit with the base terminals; thereby being operative to permit transfer of electric power from the base terminals to the filament, but only as long as an AC voltage is applied to the base terminals; and outer envelope means mounted on the screw-base and operative at least in part to enclose said inner envelope.

9. The combination of claim 8 wherein said linear electric circuit means includes a transformer.

10. The combination of claim 8 wherein said linear circuit means includes high-pass filter means operative to prevent the filament from responding to the application of a voltage of frequency about equal to or lower than the frequency of the voltage normally present on an ordinary electric utility power line.

11. The combination of claim 8 wherein said incandescent lamp is a Tungsten-Halogen lamp.

12. The combination of claim 8 wherein said outer envelope means includes a glass envelope operative to substantially enclose said inner envelope.

13. The combination of claim 8 wherein said outer envelope means is operative to prevent a person from directly touching the inner envelope.

14. The combination of claim 8 wherein said filament may be made incandescent only by application to the base terminals of a voltage of frequency substantially higher than that of the voltage normally present on an ordinary electric utility power line.

15. The combination of claim 8 further including a second incandescent lamp having a second filament sealed within a second inner envelope.

* * * * *